United States Patent

Merryweather

[15] 3,685,195
[45] Aug. 22, 1972

[54] COMBINED ROD AND REEL

[72] Inventor: Gerald Merryweather, 3120 Crescent Rim Dr., Boise, Idaho 83704

[22] Filed: Aug. 20, 1970

[21] Appl. No.: 65,385

[52] U.S. Cl. ................................................43/18
[51] Int. Cl. ............................................A01k 87/00
[58] Field of Search..........43/18, 19, 19.2, 20, 22, 23

[56] References Cited

UNITED STATES PATENTS 2,282,233  5/1942  McFerron......................43/23
2,711,292  6/1955  Taggart et al..................43/22

FOREIGN PATENTS OR APPLICATIONS 128,893  7/1919  Great Britain.................43/23

*Primary Examiner*—Warner H. Camp
*Attorney*—Anderson, Luedeka, Fitch, Even & Tabin

[57] ABSTRACT

A combined rod and reel includes a J-shaped rod having a short section and a shank lying substantially parallel to the short section, which has a handle thereon. A reel containing a coiled line is mounted for rotation at the outer end of the short section.

7 Claims, 4 Drawing Figures

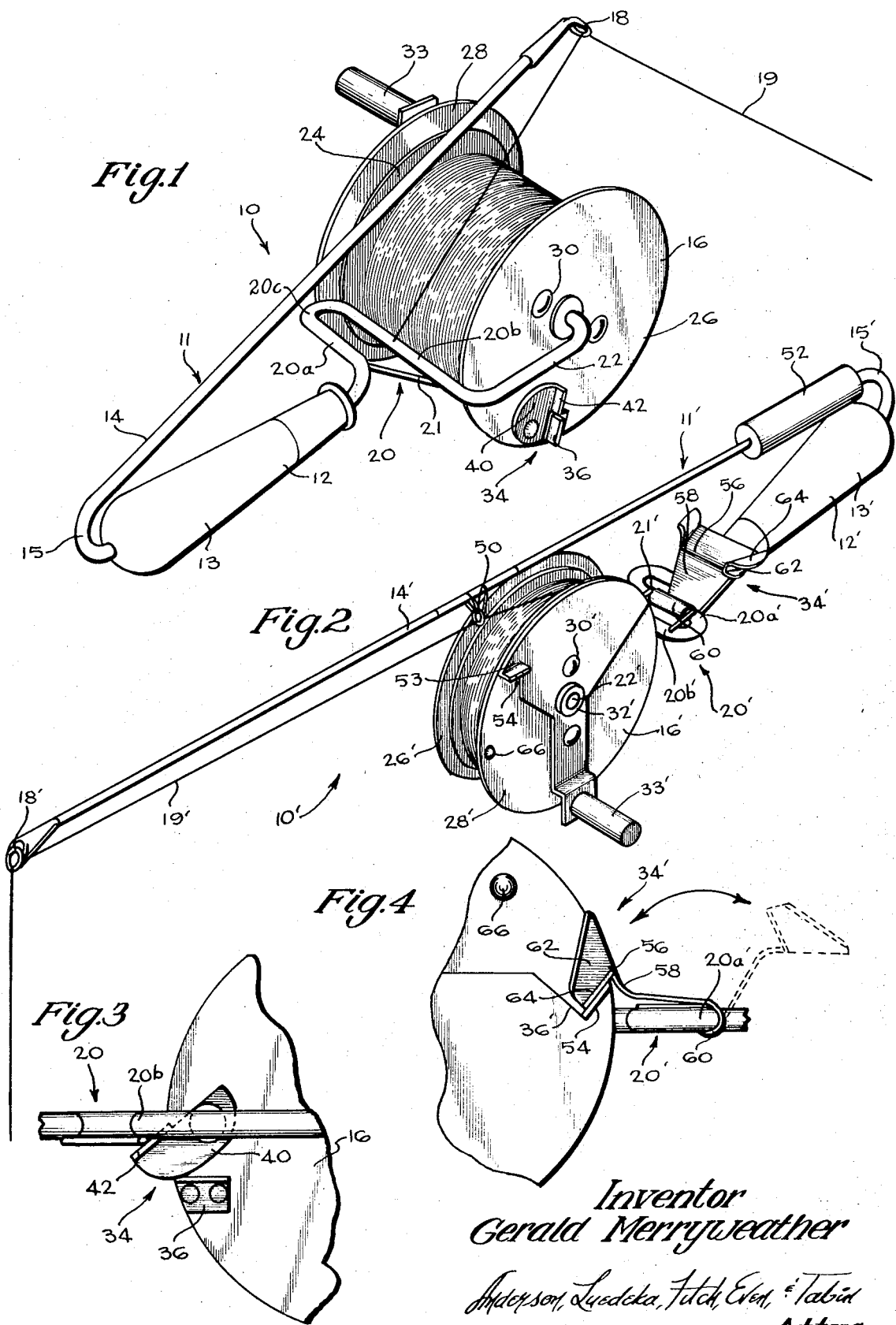

COMBINED ROD AND REEL

The present invention relates generally to rods and reels and, more particularly, to a compact combined rod and reel useful for trolling, drift bottom or ice fishing, and which may also be useful for kite flying.

Fishing rods are usually elongated so that they may be used for casting or spinning. As the rod may be many times the length of the handle, it has been found advantageous to provide a rod that is fabricated in sections that are assembled prior to use and disassembled after use for transport and storage. Such rods are particularly difficult to use in confined areas and especially in those areas that are heavily surrounded or covered by bushes, weeds or the like. Because of the long length and flexibility of a conventional rod, which feature is desirable for casting or spinning, it is difficult for the fisherman to determine whether there has been a strike or bite when the rod is used for trolling, drift or bottom fishing. As presently available rods are generally unbalanced, they may not advantageously be used for ice fishing without special supporting brackets or other equipment. Another deficiency of most fishing rods is that they are normally designed for the use of right-handed fishermen and are difficult to use by left-handed fishermen.

A principal object of the present invention, therefore, is to provide an improved, balanced, combined rod and reel useful for trolling, drift, ice or bottom fishing and further suitable for kite flying.

Another object of the invention is to provide an improved combined rod and reel that is short and compact so that it is especially useful in small clearings surrounded by bushes, weeds or the like and so that it need not be assembled and disassembled with each use thereof.

Still another object of the invention is to provide a combination fishing rod and reel that provides immediate transference to the hand of the fisherman of successful response to the bait or lure at the end of the fishing line and that can be used by either right or left-handed fishermen.

These and other objects of the invention will become apparent with reference to the following description and accompanying drawing, in which:

FIG. 1 is a perspective view of a representative combined rod and reel in accordance with the invention;

FIG. 2 is a perspective view of a second embodiment of a combined rod and reel of the invention.

FIG. 3 is a fragmentary, side elevational view of a stop device used in the rod and reel shown in FIG. 1; and FIG. 4 is a fragmentary, side elevational view of a stop device used in the rod and reel shown in FIG. 2.

Referring to FIG. 1 of the drawing, there is shown a combined rod and reel apparatus, generally designated by the reference numeral 10, primarily useful for trolling, drift, bottom or ice fishing and also useful for kite flying. The apparatus 10 comprises a generally J-shaped rod 11 having a short section 12, which includes a handle 13, and an elongated section or shank 14. The rod 11 includes a curved portion 15 extending between the short section 12 and the shank 14. A reel 16 for containing a coiled line is secured to the outer end of the short section 12. The rod 11 is fabricated of steel, plastic, fiberglass or other suitable material and may be formed in one piece.

The rod 11 doubles back such that the short section 12 and the shank 14 lie substantially parallel to one another. This configuration provides a substantially compact apparatus, as the handle 13 does not extend outwardly from the lower end of the rod, as in a conventional fishing rod. As the doubling back of the rod 11 makes the rod shorter than is usual with fishing rods, the apparatus 10 has its center of gravity at the rear thereof and is balanced so that it may be used for ice fishing without a special supporting structure. Furthermore, it is a particular feature of the present structure that the shank 14 is substantially shorter than a conventional fishing rod, being between about one to three times the length of the short section 12 or about 12 to 36 inches in length overall. As shown in FIG. 1, the shank 14 is preferably about one and one-half times the length of the short section 12. This enables the apparatus 10 to be used in small clearings surrounded by bushes, weeds or the like and permits the apparatus to be employed when desired without assembly and disassembly. The short rod 11 allows the fishing line to be readily released when the apparatus 10 is used for trolling. Moreover, the curved portion 15 of the rod 11 is sufficiently flexible that a force exerted thereupon by a fish or a kite is transmitted through the rod 11 to the short section 12 including the handle 13. This permits the fisherman to readily determine whether his endeavors have been successful.

The handle 13 is axially mounted upon the short section 12 of the rod 11 and is of any suitable type for allowing the apparatus 10 to be firmly grasped in one hand by the fisherman or kite flyer. Desirably, the handle 13 is fabricated of wood or other suitable rigid material but it is also contemplated to fabricate the handle 13 of a somewhat resilient material, such as cork or rubber. It is preferred that the handle 13 be counterbalanced to prevent vibration on release of the line and to provide a balanced apparatus upon retrieving the line. The handle 13 is advantageously formed such that it is adapted to be grasped in either the right or the left hand by the user of the apparatus depending on the position most comfortable for the user.

At the outer end of the shank 14, there is disposed a guide member 18 secured to the shank 14 for supporting a fishing line 19. The line 19 extends from the reel 16 through the guide member 18.

The rod 11 extends entirely through the handle 13 so at the rearward end of the handle there is disposed the curved portion 15 of the rod and at the forward end of the handle there is located a loop connector 20 for a purpose more fully explained below.

In order to define the loop connector at the outer end of the handle 13, the short section 12 of the rod 11 is desirably curvilinear to provide a loop. Hence, the short section 12 comprises a straight portion extending from the curved portion 15 of the rod 11 and providing support for the handle 13. The loop connector 20 extends from the straight portion and connects to the reel 16.

The loop connector 20 is generally U-shaped and includes a pair of legs 20a and 20b connected together by a curved section 20c. The loop connector 20 is closed by a keeper 21 which functions to hold in the line 19 which extends therethrough between the reel 16 and the guide member 18. The loop connector is integral with an L-shaped section 22 on which is rotatably mounted the reel 16. Desirably, the leg 20b of the loop connector 20 is substantially equal in length to the length of the reel 16. This allows the line 19 to travel back and forth on the leg 20b as it is dispensed or retrieved upon rotation of the reel 16 so that the line need not be "thumbed" across the reel 16 to even out the line. Moreover, the loop connector 20 serves to prevent the line 19 from becoming entangled.

The reel 16 has the line 19 coiled thereon. The line 19, which is of any suitable type, is wrapped upon a spool 24 of sufficient size to accommodate a desired length of line, usually up to about 5,000 feet. The spool 24 in turn is axially disposed on the reel 16.

The reel 16 comprises a pair of end plates 26 and 28 which are secured by screws 30 to the ends of the spool 24. As can be seen in FIG. 2, a nut 32' is disposed at the end 22' of the L-shaped section 22 to hold the reel 16 and the spool 24 thereupon. A crank 33 is further secured by the nut 32' and the screws 30 to the reel 16 to cause rotation of the reel upon movement of the crank.

As shown in FIGS. 1 and 3, a stop mechanism 34 is advantageously mounted upon the periphery of the reel 16 to prevent rotation of the reel upon the line 19 being extended to the desired distance. The stop mechanism 34 comprises a fixed member 36 riveted or otherwise secured to one end plate of the reel 16. Immediately adjacent the fixed member 36 is an eccentric member 40 pivotably mounted on the reel 16. The eccentric member 40 has an ear 42 that is adapted to engage the fixed member 36. The eccentric member 40 is pivotable between a first position (shown in FIG. 1) wherein the ear 42 thereof is in substantial engagement with the fixed member 36, the stop being inoperative, to a second position (shown in FIG. 3) wherein the ear 42 is in engagement with the loop connector 20 and the eccentric member is in engagement with the fixed member, the stop being operative to prevent rotation of the reel 16. When the stop mechanism 34 is in the first position, the reel 16 can rotate unhampered but when the stop mechanism is in the second position, the reel 16 will be restrained from letting out the line 19.

In operation of the combined rod and reel apparatus 10 shown in FIG. 1, the spool 24 containing a desired amount of line 19 is mounted within the reel 16. The line 19 is disposed through the loop connector 20 and the guide member 18 and a hook or lure is attached to the end of the line for fishing. When in use as an apparatus for flying a kite, a kite is attached to the end of the line 19. The line 19 is then unwound by rotating the reel 16 counterclockwise by means of the crank 33. It is also contemplated that the apparatus 10 can be used for casting, so long as sufficient line is reeled off before making the cast. When the apparatus is used for trolling, once the proper distance is determined, the line is released the same distance each time it is used. While playing out the line 19, the member 40 of the stop mechanism 34 is located in its first position wherein the ear 42 thereof engages the fixed member 36, so that the stop does not interfere with rotation of the reel. When the line has been extended to the desired distance, the eccentric member 40 is pivoted by the user into its second position so that the ear 42 thereof engages the loop connector 20, thereby preventing further rotation of the reel 16. When it is desired to retrieve the line 19, the crank 33 is rotated clockwise until the line is substantially completely coiled upon the spool 24 mounted within the reel 16.

In FIG. 2, there is shown a modified embodiment 10' of the combined rod and reel apparatus of the invention. Like numerals are employed in combination with a prime symbol in the following description of the modified embodiment to designate like parts. The apparatus 10' similarly comprises a rod 11' having a short section 12' with a handle 13' thereon, a shank 14' connected to the short section 12' by a curved portion 15', and a reel 16'. The shank 14' is of greater length than the shank 14 of the first embodiment, a second guide member 50 being advantageously employed at a point about midway along the length of the shank 14' for supporting a line 19'. A loop connector 20' having legs 20a' and 20b' and closed by a keeper 21' holds the line 19'. A second handle 52 is desirably disposed upon the portion of the shank 14' adjacent the first handle 13' to permit more effective handling of the device, the second handle 52 and the handle 13' being grasped concurrently in one hand.

In accordance with the second embodiment of the invention, as shown in FIG. 2, a stop mechanism 34' is utilized which is substantially different from the stop mechanism 34 of the first embodiment. A fixed member 53 is advantageously mounted upon one end plate of the reel 16' upon which the crank 33' is also located, the fixed member 53 having an outwardly extending ear 54. A pivotable member 56 is pivotally mounted upon the leg 20a' of the loop connector 20'. The pivotable member 56 is movable between a first position wherein it extends toward the handle of the apparatus, and wherein it is inoperative, and a second position wherein it is in engagement with the reel 16' to prevent rotation thereof. As shown in FIG. 4, the operative or engaged position of the pivotable member 56 is shown in solid lines, while the inoperative or disengaged position of the pivotable member 56 is shown in dotted lines.

Thus, while the stop mechanism 34 is mounted on the reel 16 and is adapted to engage the loop connector 20, the stop mechanism 34' is mounted on the loop connector 20' and is adapted to engage the reel 16. The pivotable member 56 generally comprises a curvilinear body portion 58, a channel 60 at one end of the body portion 58 for pivotably mounting the pivotable member 56 to the loop connector 20', and a pair of outwardly extending flanges 62 at the side edges of the body portion 58 for frictionally engaging the periphery of the reel 16' to prevent rotation thereof. At least one of the flanges 62 has an outwardly extending ear 64 adapted to engage the ear 54 of the fixed member 53 to ensure that the reel does not rotate. A dimple 66 on the reel 16' prevents the stop mechanism 34' from engaging while the line 19' is being played out. The apparatus 10' is operated in substantially the same manner as is the apparatus 10.

Thus, a combined rod and reel has been provided for trolling, drift, bottom or ice fishing or for kite flying. The compact fishing rod and reel is particularly useful in small clearings that are surrounded by bushes, weeds or the like. The apparatus need not be assembled and disassembled with each use thereof. The rod and reel combination of the present invention is simple, inexpensive, does not require extensive maintenance, and provides excellent control over fish at the end of the line.

While specific forms of the invention have been shown and described, it should be apparent that various modifications could be made therein without departing from the scope of the invention. For example, the curved portion 15 of the rod 11 might be made of an extremely flexible material so that the apparatus could be used for jigging the line upon squeezing the handle 13 and the shank 14 together.

Various of the features of the invention are set forth in the following claims.

What is claimed is:

1. A combined rod and reel comprising a substantially J-shaped rod having a short section and shank, said short section having a handle and said shank having a guide member at the outer end thereof, said short section and said shank being substantially parallel to each other, a reel rotatably mounted at the outer end of said short section and containing a coiled line thereon, said line extending from said reel through said guide member, and a loop connector for supporting said line, the length of a leg of said loop connector and said reel being substantially equal.

2. A combination according to claim 1 wherein said short section and said shank are flexibly connected.

3. A combination according to claim 1 wherein said shank is between about one and about three times the length of said short section.

4. A combination according to claim 1 further comprising a second handle mounted on a portion of said shank adjacent said first-mentioned handle such that said handle and said second handle may be grasped concurrently in one hand.

5. A combination according to claim 1 further comprising stop means between said loop connector and said reel adapted to prevent rotation of said reel.

6. A combination according to claim 5 wherein said stop means is pivotally mounted on said reel and is adapted to engage said loop connector.

7. A combination according to claim 5 wherein said stop means is pivotally mounted on said loop connector and is adapted to engage said reel.

* * * * *